US012791344B2

(12) United States Patent
Fan et al.

(10) Patent No.: US 12,791,344 B2
(45) Date of Patent: Nov. 10, 2026

(54) TRAJECTORY PREDICTION METHOD AND APPARATUS THEREFOR, MEDIUM, PROGRAM PRODUCT, AND ELECTRONIC DEVICE

(71) Applicant: HUAWEI TECHNOLOGIES CO., LTD., Shenzhen (CN)

(72) Inventors: Shiwei Fan, Shenzhen (CN); Xiangxu Li, Shenzhen (CN); Bing Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 19/010,804

(22) Filed: Jan. 6, 2025

(65) Prior Publication Data

US 2025/0137796 A1 May 1, 2025

Related U.S. Application Data

(63) Continuation of application No. PCT/CN2023/105737, filed on Jul. 4, 2023.

(30) Foreign Application Priority Data

Jul. 6, 2022 (CN) ........................ 202210800169.X

(51) Int. Cl.
*G01C 21/34* (2006.01)

(52) U.S. Cl.
CPC ................................ *G01C 21/3492* (2013.01)

(58) Field of Classification Search
CPC .......... G01C 21/3492; B60W 2554/40; B60W 2556/10; B60W 50/0097;
(Continued)

(56) References Cited

U.S. PATENT DOCUMENTS

2019/0228648 A1* 7/2019 Moustafa ............. G08G 1/0145
2020/0331465 A1* 10/2020 Herman ................. G08G 1/166
2020/0346662 A1* 11/2020 Suzuki ............ B60W 60/00276
2021/0270620 A1* 9/2021 Nepomuceno ..... G01C 21/3626

FOREIGN PATENT DOCUMENTS

CN 111046919 A * 4/2020 ............. G06N 3/045
CN 113511222 A 10/2021
(Continued)

OTHER PUBLICATIONS

Zhao Wanzhong et al., Nov. 21, 2019 English Machine Translation_ CN 111046919 A provided by Patent Translate by EPO and Google (Year: 2019).*
(Continued)

*Primary Examiner* — Ashley L Redhead, Jr.
(74) *Attorney, Agent, or Firm* — Fish & Richardson P.C.

(57) ABSTRACT

This application provides a trajectory prediction method and an apparatus therefor, a medium, a program product, and an electronic device. An example trajectory prediction method includes: obtaining historical trajectory information of a target vehicle and an associated vehicle; predicting location distribution information of the target vehicle and the associated vehicle based on the historical trajectory information and map information; determining an interaction feature between the target vehicle and the associated vehicle based on the location distribution information; and determining a traveling trajectory of the target vehicle based on the interaction feature, the location distribution information of the target vehicle, and the map information.

20 Claims, 11 Drawing Sheets

(58) Field of Classification Search
CPC .............. B60W 60/00276; G06N 3/04; G06N 3/044; G06N 3/0442; G06N 3/045; G06N 3/0455; G06N 3/0464; G06N 3/047; G06N 3/048; G06N 3/08; G06N 3/084; G06N 3/09; G08G 1/166; G08G 1/167; G08G 1/0104; G08G 1/0129; G08G 1/0137
See application file for complete search history.

(56) References Cited

FOREIGN PATENT DOCUMENTS

| | | | | |
|---|---|---|---|---|
| CN | 114067178 A | | 2/2022 | |
| CN | 114092751 A | * | 2/2022 | ......... G01C 21/3407 |
| WO | 2021107380 A1 | | 6/2021 | |

OTHER PUBLICATIONS

He Hao et al., Jul. 9, 2020 English Machine Translation_CN 114092751 A provided by Patent Translate by EPO and Google (Year: 2020).*
International Search Report and Written Opinion in International Appln. No. PCT/CN2023/105737, mailed on Sep. 27, 2023, 17 pages (with English Translation).
Kim et al., “Multi-Head Attention-based Probabilistic Vehicle Trajectory Prediction,” CS, Submitted on Apr. 8, 2020, arXiv:2004.03842v1, 6 pages.
Extended European Search Report in European Appln. No. 23834853.6, mailed on Sep. 15, 2025, 8 pages.

* cited by examiner

TRAJECTORY PREDICTION METHOD AND APPARATUS THEREFOR, MEDIUM, PROGRAM PRODUCT, AND ELECTRONIC DEVICE

CROSS-REFERENCE TO RELATED APPLICATIONS

This application is a continuation of International Application No. PCT/CN2023/105737, filed on Jul. 4, 2023, which claims priority to Chinese Patent Application No. 202210800169.X, filed on Jul. 6, 2022. The disclosures of the aforementioned applications are hereby incorporated by reference in their entireties.

TECHNICAL FIELD

This application relates to the field of intelligent driving technologies, and in particular, to a trajectory prediction method and an apparatus therefor, a medium, a program product, and an electronic device.

BACKGROUND

With development of economy and improvement of people's living standards, an increasing installed base of vehicles year on year poses higher requirements for safe driving. To improve vehicle driving safety, an intelligent driving technology is currently applied in vehicles, to implement assisted driving and autonomous driving of the vehicles.

In an intelligent driving process of a vehicle, vehicle intention prediction needs to be performed. In other words, a future behavior intention of the vehicle is predicted based on traveling trajectories of the vehicle at a current moment and historical moments. In a real environment, when vehicle intention prediction is performed on a target vehicle, impact of a surrounding vehicle on the target vehicle usually needs to be considered. However, an existing method has relatively poor precision in predicting a future traveling trajectory of the target vehicle based on traveling trajectories of the target vehicle and the surrounding vehicle at historical moments.

SUMMARY

In view of this, embodiments of this application provide a trajectory prediction method and an apparatus therefor, a medium, a program product, and an electronic device.

According to a first aspect, an embodiment of this application provides a vehicle trajectory prediction method. The method is applied to an electronic device and includes:

obtaining historical trajectory information of a target vehicle and an associated vehicle of the target vehicle;

predicting location distribution information of the target vehicle and location distribution information of the associated vehicle in a preset future time period based on the historical trajectory information and map information corresponding to a traveling environment of the target vehicle and the associated vehicle;

determining an interaction feature between the target vehicle and the associated vehicle in the preset future time period based on the location distribution information; and determining a traveling trajectory of the target vehicle in the preset future time period based on the interaction relationship, the location distribution information of the target vehicle in the preset future time period, and the map information.

To be specific, in some embodiments of this application, the target vehicle herein may be a vehicle on which traveling trajectory prediction is performed, and the associated vehicle may include a vehicle on a lane adjacent to a lane on which the target vehicle is located, a vehicle on the same lane as the target vehicle, and another vehicle located around the target vehicle in a travelable area, for example, in a parking lot. The historical trajectory information herein may include traveling routes that the target vehicle and the associated vehicle have traveled through on a map before a time point at which traveling trajectory prediction is performed on the target vehicle, that is, at historical moments. The traveling environment herein may be a surrounding environment in which the target vehicle and the associated vehicle are located, and the map information may include but is not limited to map elements such as an intersection type, a lane line, a lane quantity, a travelable area, a zebra crossing, whether a road is congested, a traffic flow speed, a traffic flow acceleration, and a distance between a vehicle and an obstacle. The location distribution information herein may indicate probabilities that the target vehicle and the associated vehicle appear at locations on the map at future moments from the time point at which traveling trajectory prediction is performed on the target vehicle. The interaction feature herein, namely, an interaction feature, indicates mutual impact between the target vehicle and the associated vehicle in a traveling process. For example, the associated vehicle cuts in front of or gives way to the target vehicle, and the target vehicle accelerates past or avoids the associated vehicle. The traveling trajectory in the preset future time period herein is a future trajectory of the target vehicle, and may be understood as a traveling route of the target vehicle in the preset future time period.

According to the method in embodiments of this application, a process of predicting the future trajectory of the target vehicle is divided into two phases for execution. In a first phase, the location distribution information of the target vehicle and the location distribution information of the associated vehicle at the future moments is obtained based on historical trajectories of the target vehicle and the associated vehicle, and the location distribution information is used as interaction relationships between the target vehicle and the associated vehicle at moments (historical moments and the future moments). In a second phase, the traveling trajectory of the target vehicle in the preset future time period is predicted based on the interaction relationships between the target vehicle and the associated vehicle at the moments, the location distribution information of the target vehicle at the future moments, and the map information of the map. It can be learned that impact of the associated vehicle on the traveling trajectory of the target vehicle at the future moments can be more precisely indicated and impact of the associated vehicle on the traveling trajectory of the target vehicle can be more easily determined by using the interaction relationships between the target vehicle and the associated vehicle at the future moments, to achieve high prediction precision. In addition, the location distribution information of the target vehicle and the location distribution information of the associated vehicle may further be stored. When an abnormal result is obtained during prediction of the traveling trajectory of the target vehicle, the abnormal result may be traced back based on the stored location distribution information, so that the trajectory prediction method has high prediction precision and traceability.

In a possible implementation of the first aspect, the associated vehicle includes a vehicle on the lane adjacent to the lane on which the target vehicle is located in the traveling environment of the target vehicle and a vehicle on the same lane as the target vehicle.

To be specific, in embodiments of this application, the associated vehicle may include a vehicle on the lane adjacent to the lane on which the target vehicle is located, a vehicle on the same lane as the target vehicle, and another vehicle located around the target vehicle in the travelable area, for example, in the parking lot.

In a possible implementation of the first aspect, the historical trajectory information includes at least one of location information of the target vehicle and the associated vehicle obtained by the target vehicle by using a sensor, or location information of the target vehicle and the associated vehicle in a map corresponding to the traveling environment.

To be specific, in embodiments of this application, the historical trajectory information may include location information that is of the target vehicle and the associated vehicle at a plurality of consecutive moments on the map and that is obtained from the sensor (GPS sensor) of the target vehicle. The historical trajectory information may be obtained from a video that includes the target vehicle and the associated vehicle.

In a possible implementation of the first aspect, the obtaining historical trajectory information of a target vehicle and an associated vehicle of the target vehicle further includes:

obtaining, in a first processing manner, a feature vector of the historical trajectory information by using the historical trajectory information as input.

In a possible implementation of the first aspect, the first processing manner includes: encoding the historical trajectory information by using an LSTM algorithm, to obtain the feature vector indicating the historical trajectory information.

To be specific, in embodiments of this application, historical trajectory information of associated vehicles is converted into coordinates in a coordinate system of the target vehicle, and feature vectors of the associated vehicles are obtained through LSTM network encoding. The feature vectors of the associated vehicles are fused through social pooling, to obtain a fused feature vector of the associated vehicles, that is, a trajectory feature of the associated vehicles. Then, a feature vector of the historical trajectory information of the target vehicle is fused with the feature vector of the associated vehicles.

In a possible implementation of the first aspect, the predicting location distribution information of the target vehicle and location distribution information of the associated vehicle in a preset future time period based on the historical trajectory information and map information corresponding to a traveling environment of the target vehicle and the associated vehicle includes:

performing feature extraction on the map information corresponding to the traveling environment, to obtain a semantic feature indicating the map information, where the semantic feature of the map information includes a lane and the travelable area in the traveling environment; and obtaining, in a second processing manner, the location distribution information of the target vehicle and the location distribution information of the associated vehicle in the preset future time period by using the semantic feature of the map information and the historical trajectory information as input.

In a possible implementation of the first aspect, the second processing manner includes: fusing the semantic feature of the map information and the feature vector of the historical trajectory information, to obtain the location distribution information.

To be specific, in embodiments of this application, after the semantic feature of the map information and a semantic feature of the historical trajectory information of the target vehicle are fused with the trajectory feature of the associated vehicle, the location distribution information of the target vehicle and the location distribution information of the associated vehicle at the moments in the preset future time period may be obtained.

In a possible implementation of the first aspect, the interaction feature indicates at least one of the following: in the preset future time period, the associated vehicle cuts in front of or gives way to the target vehicle, and the target vehicle avoids or accelerates past the associated vehicle.

In a possible implementation of the first aspect, the determining an interaction feature between the target vehicle and the associated vehicle in the preset future time period based on the location distribution information includes:

fusing the location distribution information of the target vehicle and the location distribution information of the associated vehicle in the preset future time period based on a location relationship between a current location of the target vehicle and a current location of the associated vehicle in the traveling environment, to obtain the interaction feature between the target vehicle and the associated vehicle in the preset future time period.

In a possible implementation of the first aspect, the fusing the location distribution information of the target vehicle and the location distribution information of the associated vehicle in the preset future time period includes:

performing encoding by using a CNN algorithm by using the location distribution information of the target vehicle and the location distribution information of the associated vehicle in the preset future time period as input, to obtain feature vectors corresponding to the location distribution information of the target vehicle and the location distribution information of the associated vehicle; and fusing, by using a fusion model, the feature vectors corresponding to the location distribution information of the target vehicle and the location distribution information of the associated vehicle.

To be specific, in embodiments of this application, the location distribution information of the target vehicle and the location distribution information of the associated vehicle are obtained, coordinate conversion from the associated vehicle to the target vehicle is calculated, the location distribution information of the associated vehicle is converted into coordinates in the target coordinate system of the target vehicle, and CNN encoding is performed on the location distribution information of the associated vehicle at the moments in the preset future time period and then combination is performed, to obtain combined location distribution information, and the combined location distribution information is used as an interaction feature of the target vehicle.

In a possible implementation of the first aspect, the predicting a traveling trajectory of the target vehicle in the preset future time period based on the interaction relationship, the location distribution information of the target vehicle in the preset future time period, and the map information includes:

fusing the interaction relationship, the location distribution information of the target vehicle in the preset future time period, and the map information by using a multi-head self-attention model, to obtain the traveling trajectory of the target vehicle in the preset future time period, where the traveling trajectory indicates locations of the target vehicle in the preset future time period in the traveling environment.

To be specific, in embodiments of this application, the interaction relationships between the target vehicle and the associated vehicle at the moments in the preset future time period, the location distribution information of the target vehicle, and the semantic feature of the map information are used as input, to obtain, through CNN network encoding, feature vectors corresponding to the interaction relationships between the target vehicle and the associated vehicle at the moments in the preset future time period, the location distribution information of the target vehicle, and the semantic feature of the map information. The foregoing feature vectors are fused by using the multi-head self-attention model, and the locations of the target vehicle at the moments in the preset future time period, that is, the traveling trajectory of the target vehicle in the preset future time period, are obtained through a fully connected layers.

According to a second aspect, an embodiment of this application provides a computer-readable storage medium. The computer-readable storage medium stores instructions. When the instructions are executed on an electronic device, the electronic device is enabled to perform the vehicle trajectory prediction method in the first aspect.

According to a third aspect, an embodiment of this application provides a computer program product. The computer program product includes instructions. When the instructions are executed by one or more processors, the vehicle trajectory prediction method in the first aspect is implemented.

According to a fourth aspect, an embodiment of this application provides an electronic device, including:

a memory, configured to store instructions executed by one or more processors of the electronic device; and the processor, where when the instructions are executed by the one or more processors, the processor is configured to perform the vehicle trajectory prediction method in the first aspect.

BRIEF DESCRIPTION OF DRAWINGS

To describe technical solutions in embodiments of this application more clearly, the following briefly describes the accompanying drawings for describing embodiments. It is clear that the accompanying drawings in the following description show merely some embodiments of this application, and a person of ordinary skill in the art may still derive other drawings from these accompanying drawings without creative efforts.

DESCRIPTION OF EMBODIMENTS

Illustrative embodiments of this application include but are not limited to a trajectory prediction method and an apparatus therefor, a medium, a program product, and an electronic device.

To make objectives, technical solutions, and advantages of this application more comprehensible, the following describes this application in detail with reference to embodiments and accompanying drawings. It should be understood that the specific embodiments described herein are merely used to explain this application but are not intended to limit this application.

To better understand the technical solutions provided in embodiments of this application, terms in the present disclosure are first described herein.

Figure 1A:
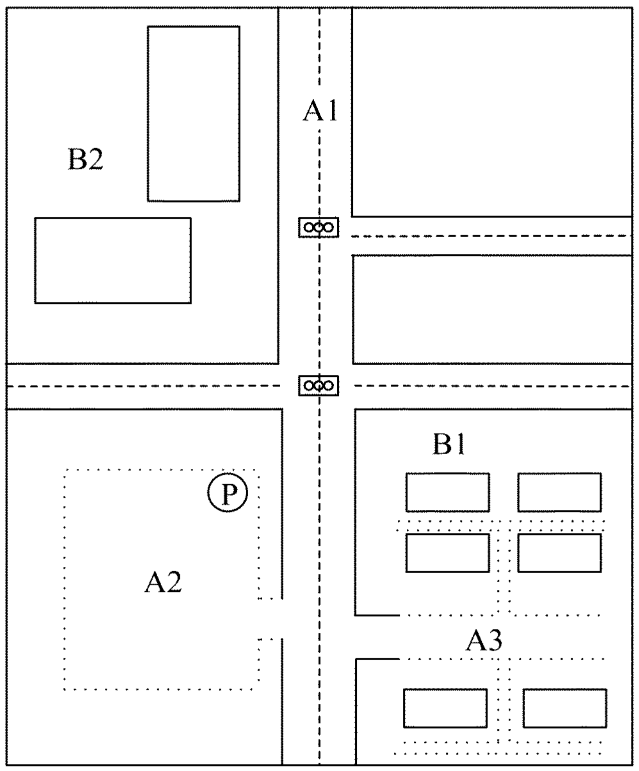
FIG. 1*a* is a diagram of a scenario of map information on a high-definition map according to an embodiment of this application.

High-definition map: The high-definition map herein may be a map of a bird's eye view (BEV) type. For example, the high-definition map may be a two-dimensional map of a top view type. The high-definition map may include map information, for example, an intersection, a lane, a lane quantity, a travelable area, an obstacle, and a building. The travelable area herein may include a parking lot, a parking spot, and an area that a vehicle may enter and that is not marked with a lane line. FIG. 1*a* is a diagram of a high-definition map according to an embodiment of this application. As shown in FIG. 1*a*, the high-definition map may include a lane A1, a parking lot A2, a road A3 in a neighborhood, a building B1, and a building B2.

Figure 1B:
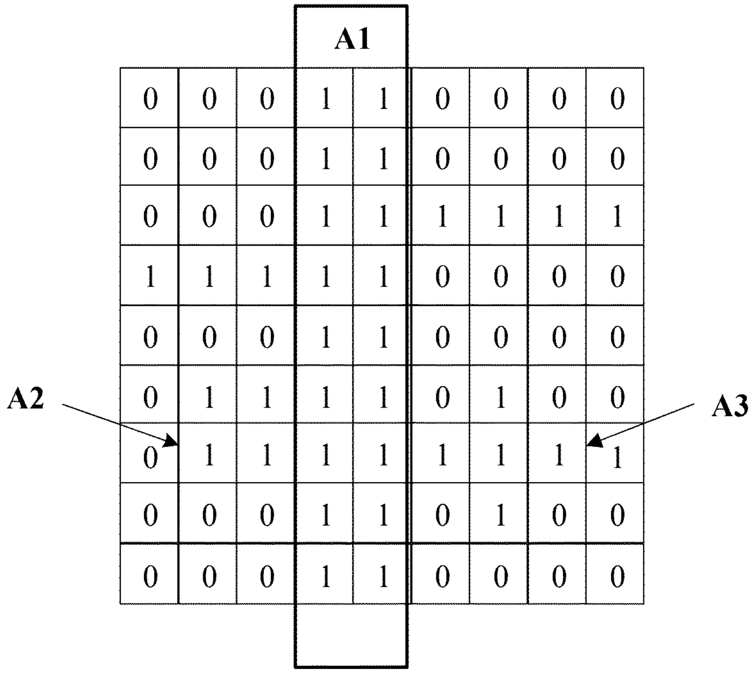
FIG. 1*b* is a diagram of a scenario of a raster image corresponding to map information on a high-definition map according to an embodiment of this application.

Raster image: The raster image is an image including a series of rasters. In embodiments of this application, the high-definition map may be converted into a corresponding raster image. In the converted raster image, map information included in the high-definition map is in corresponding rasters in the raster image. In the raster image, a raster value may be given to each raster. For example, a value of the raster value may be 0 or 1. The raster value indicates whether the raster includes the map information. If the raster includes the map information, the raster value is 1. If the raster does not include the map information, the raster value is 0. Whether the raster includes the map information may be determined based on a coverage rate of the map information in the raster. For example, a lane in the map information is used as an example. When a coverage rate of the lane in the raster exceeds 50%, it may be considered that the raster includes the lane. When a coverage rate of the lane in the raster does not exceed 50%, it is considered that the raster does not include the lane. FIG. 1*b* is a diagram of a raster image corresponding to lane information on a high-definition map according to an embodiment of this application. As shown in FIG. 1*b*, in the raster image corresponding to the high-definition map, rasters with raster values of 1 indicates lanes A1 and A2 on the high-definition map, and rasters with raster values of 0 may indicate other non-lane information (for example, a building or an obstacle) on the high-definition map.

Figure 2A:
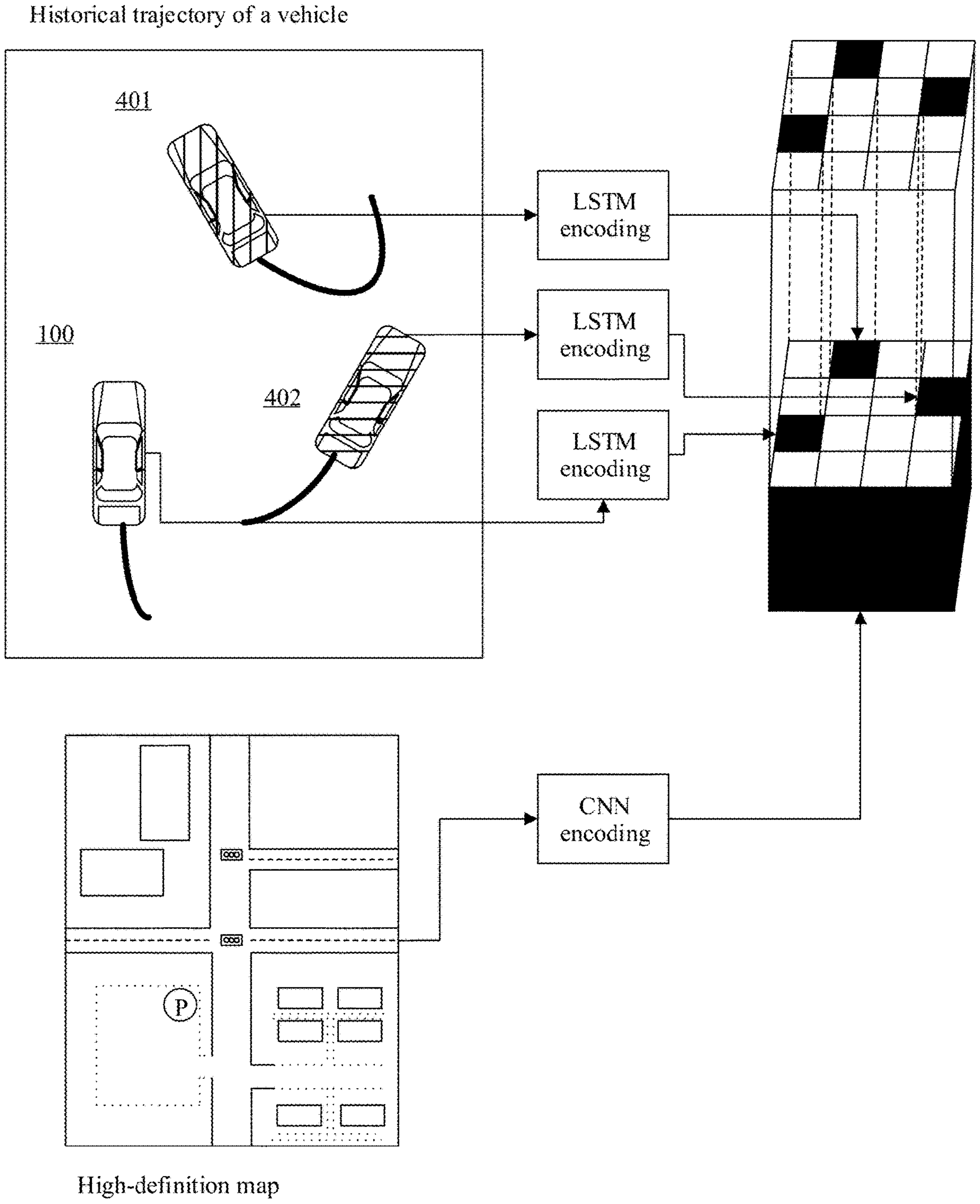
FIG. 2*a* is a diagram of an application scenario of a trajectory prediction method according to an embodiment of this application.
Figure 2B:
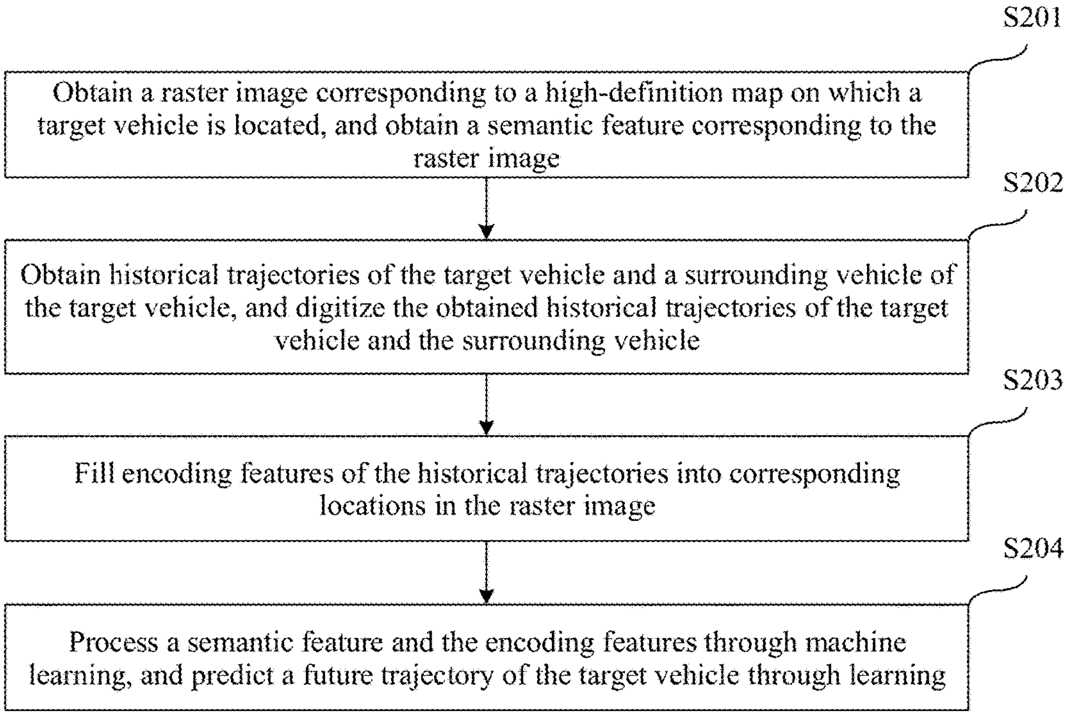
FIG. 2*b* is a schematic flowchart of a trajectory prediction method according to an embodiment of this application.

In some embodiments of this application, a future traveling trajectory of a target vehicle on the high-definition map may be predicted by using a machine learning method based on historical trajectories of the target vehicle and a surrounding vehicle in the raster image and map information (the lane or a travelable area) in the raster image. The surrounding vehicle herein may include a vehicle on a lane adjacent to a lane on which the target vehicle is located, a vehicle on the same lane as the target vehicle, and another vehicle located around the target vehicle in the travelable area, for example, in a parking lot. Specifically, FIG. 2*a* shows an application scenario of a trajectory prediction method to which an embodiment of this application is applicable, according to some embodiments of this application. The trajectory prediction method shown in FIG. 2*a* may be performed by a target vehicle 100 on which an intelligent driving apparatus is disposed, or may be performed by an intelligent road prediction system configured to monitor a road condition. Specifically, as shown in FIG. 2*b*, the following steps are included.

S201: Obtain a raster image corresponding to a high-definition map on which a target vehicle is located, and obtain a semantic feature corresponding to the raster image.

Herein, the semantic feature indicates a lane, a travelable area, and the like in map information of the high-definition map by using a feature vector. For example, a lane A1, a parking lot A2, and a road A3 in a neighborhood in FIG. 1*a* are indicated by the semantic feature. Specifically, the high-definition map on which the target vehicle and a surrounding vehicle are located may be encoded into a raster image that indicates the map information on the high-definition map of a bird's eye view type, and then the raster image is processed by using a convolutional neural network (CNN), to obtain the semantic feature corresponding to the map information (for example, the lane or the travelable area).

S202: Obtain historical trajectories of the target vehicle and the surrounding vehicle of the target vehicle, and digitize the obtained historical trajectories of the target vehicle and the surrounding vehicle.

For example, encoding features corresponding to the historical trajectories of the target vehicle and the surrounding vehicle are generated. The encoding features herein may indicate the historical trajectories of the target vehicle and the surrounding vehicle by using feature vectors.

Specifically, for example, the historical trajectories of the target vehicle and the surrounding vehicle may be obtained by using a sensor (for example, a Global Positioning System (GPS) sensor and a lidar) of the target vehicle, or the historical trajectories that are of the target vehicle and the surrounding vehicle and that are recorded on the high-definition map may be obtained. The historical trajectories of the target vehicle and surrounding vehicle are digitized by using a long short-term memory (LSTM) network algorithm, to obtain the encoding features corresponding to the historical trajectories.

S203: Fill the encoding features of the historical trajectories into corresponding locations in the raster image.

Specifically, the filling the encoding features of the historical trajectories into corresponding locations in the raster image mean marking the historical trajectories of the target vehicle and the surrounding vehicle in the raster image. In the raster image marked with the historical trajectories, an interaction feature between the historical trajectories of the target vehicle and the surrounding vehicle can be indicated. Therefore, the encoding feature may be referred to as an interaction feature. The interaction feature herein indicates mutual impact between the target vehicle and the surrounding vehicle in a traveling process. For example, the surrounding vehicle cuts in front of or gives way to the target vehicle, and the target vehicle accelerates past or avoids the surrounding vehicle.

S204: Process the semantic feature and the encoding features through machine learning, and predict a future trajectory of the target vehicle through learning.

Specifically, based on the map information, for example, the lane or the travelable area, of the high-definition map on which the target vehicle and the surrounding vehicle are located, the historical trajectories of the target vehicle and the surrounding vehicle are learned, to predict the future trajectory of the target vehicle through learning. In other words, the semantic feature corresponding to the map information and the encoding features of the historical trajectories are combined and processed by using the convolutional neural network, to output the predicted future trajectory of the target vehicle.

It may be understood that, in some embodiments of this application, in the application scenario shown in FIG. 2*a*, in a process of encoding the high-definition map into the raster image, locations of map elements (the lane, the travelable area, and the like) in the map information may be further converted into coordinates in a target vehicle centered coordinate system, and are drawn in different colors in the raster image. Historical trajectories of surrounding vehicles are sequentially encoded by using an LSTM algorithm, to obtain encoding features of the historical trajectories of the surrounding vehicles, and then rasters correspond to last locations of the surrounding vehicles in the raster image are calculated, and the encoding features are filled into the rasters. When more than one surrounding vehicle is located in a same raster in the raster image, a pooling method may be further used for combination. For example, an average value of the encoding features of the plurality of surrounding vehicles is obtained through average pooling.

The application scenario of FIG. 2*a* describes the method for predicting the future trajectory of the target vehicle by using interaction features between the target vehicle and the surrounding vehicles based on the encoding features of the historical trajectories of the surrounding vehicles (a surrounding vehicle 401 and a surrounding vehicle 402) corresponding to the target vehicle 100 on the high-definition map. A specific surrounding vehicle that affects the target vehicle cannot be clearly determined. Therefore, whether the surrounding vehicle affects the future trajectory of the target vehicle cannot be precisely predicted only based on a relationship between the historical trajectories of the target vehicle and the surrounding vehicle. For example, a historical trajectory of the surrounding vehicle 401 may only indicate that the surrounding vehicle 401 is constantly traveling straight at historical moments, but this does not indicate that the surrounding vehicle 401 will be still travel straight at future moments. Therefore, whether the surrounding vehicle 401 affects the future trajectory of the target vehicle 100 at the future moments cannot be precisely predicted. In addition, during estimation impact on the predicted future trajectory of the target vehicle based on the encoding features of the historical trajectories of the surrounding vehicles corresponding to the target vehicle, the historical trajectories of the surrounding vehicles cannot intuitively reflect the impact on the predicted future trajectory of the target vehicle. Consequently, a learning model has low efficiency in predicting the future trajectory of the target vehicle based on the historical trajectories of the target vehicle and the surrounding vehicle. For example, the high-definition map and the historical trajectories of the target vehicle 100, the surrounding vehicle 401, and the surrounding vehicle 402 are not suitable for being used as learning samples of a machine learning model.

Figure 3A:
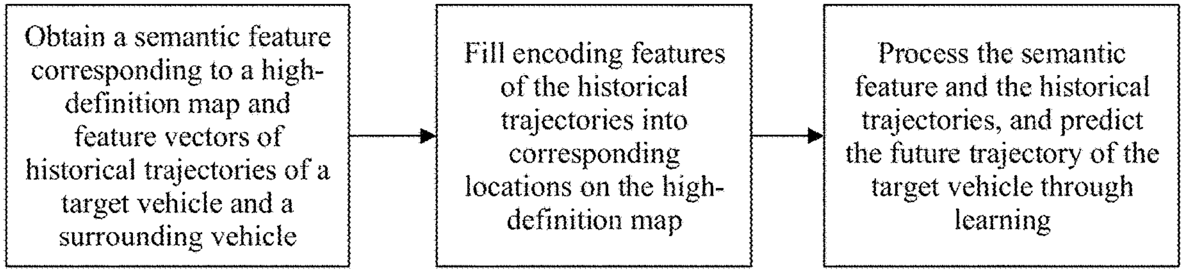
FIG. 3*a* and FIG. 3*b* are schematic flowcharts of another trajectory prediction method according to an embodiment of this application.
Figure 3B:
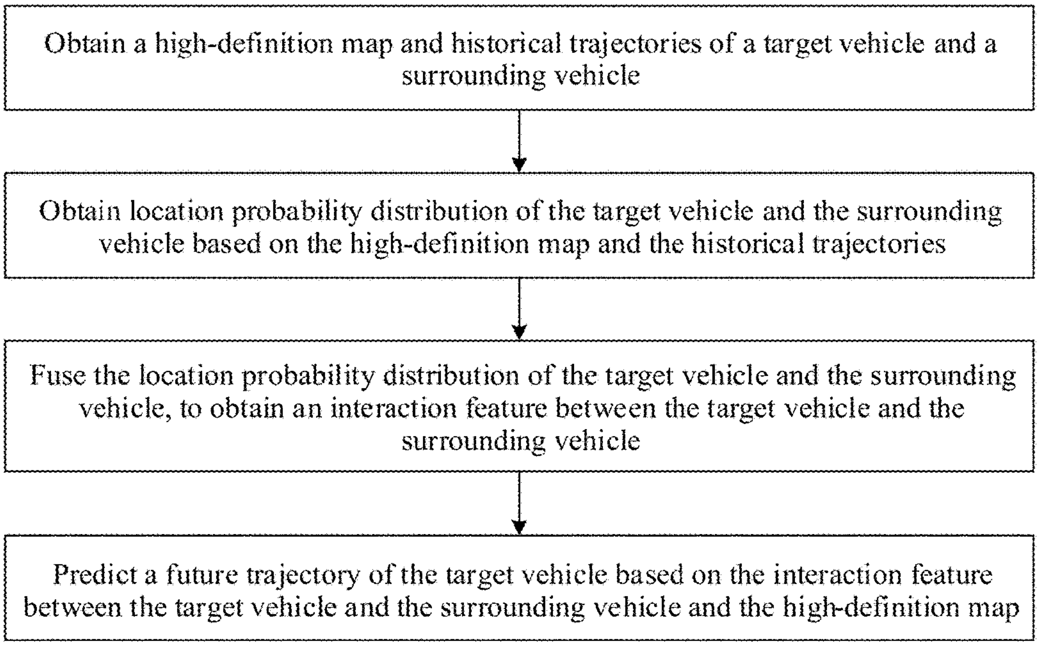

Therefore, an embodiment of this application provides a trajectory prediction method. According to the trajectory prediction method described in FIG. 3*a*, a semantic feature corresponding to a high-definition map and feature vectors of historical trajectories of a target vehicle and a surrounding vehicle are obtained. Encoding features of the historical trajectories are filled into corresponding locations on the high-definition map. The semantic feature and the historical trajectories are processed, and a future trajectory of the target vehicle is predicted through learning. As shown in FIG. 3*b*, after the feature vectors of the historical trajectories of the target vehicle and the surrounding vehicle are obtained, a future location probability distribution of the target vehicle and the surrounding vehicle is first predicted by using the feature vectors of the historical trajectories of the target vehicle and the surrounding vehicle based on a location relationship between the target vehicle and the surrounding vehicle on the high-definition map. The location probability distribution indicates probabilities that the target vehicle and the surrounding vehicle appear at locations on the high-definition map at future moments, to obtain an interaction feature between the future target vehicle and the surrounding vehicle. Then, the future trajectory of the target vehicle is predicted with reference to the predicted future location probability distribution of the target vehicle and the surrounding vehicle and map information of the high-definition map. The future location probability distribution of the target vehicle and the surrounding vehicle can more accurately and clearly describe locations of the target vehicle and the surrounding vehicle at the future moments on the high-definition map, that is, the interaction feature between the target vehicle and the surrounding vehicle. Therefore, the future trajectory of the target vehicle can be more precisely predicted based on the future location probability distribution of the target vehicle and the surrounding vehicle and with reference to the map information of the high-definition map.

Specifically, the process of predicting the future trajectory of the target vehicle may be divided into two phases for execution. In a first phase, the semantic feature of a raster image corresponding to the high-definition map on which the target vehicle is located is obtained, and the encoding features of the historical trajectories of the target vehicle and the surrounding vehicle of the target vehicle are obtained. The location probability distribution of each vehicle of the target vehicle and the surrounding vehicle at the future moments is obtained based on the semantic feature and the encoding features. For example, the semantic feature of the high-definition map on which the target vehicle and the surrounding vehicle are located, the encoding features of the historical trajectories of the target vehicle, and the encoding features of the historical trajectories of the surrounding vehicle are fused, to obtain the location probability distribution of the target vehicle and the surrounding vehicle at the future moments on the high-definition map. For example, based on the high-definition map, the location of the surrounding vehicle on the high-definition map is converted into coordinates in a coordinate system of the target vehicle, and the historical trajectories of the target vehicle and the surrounding vehicle are fused by using a maximum pooling method, to obtain the location probability distribution of the target vehicle and the surrounding vehicle at the future moments. The location probability distribution is used as interaction features between the target vehicle and the surrounding vehicle at moments (historical moments and the future moments), and indicates mutual impact between the target vehicle and the surrounding vehicle at the moments (the historical moments and the future moments) in a traveling process. In a second phase, the future trajectory of the target vehicle is predicted through machine learning based on the interaction features between the target vehicle and surrounding vehicle at the moments, the location probability distribution of the target vehicle at the future moments, and the map information of the high-definition map. For example, the interaction features between the target vehicle and the surrounding vehicle at the moments, the location probability distribution of the target vehicle at the future moments, and the map information are used as input, to predict the future trajectory of the target vehicle by using a temporal attention model. The temporal attention model herein is used to predict a periodically distributed data sequence with a time series attribute.

The location probability distribution herein may be an occupancy distribution map (ODM). The occupancy distribution map indicates a distribution map of probabilities that the target vehicle and the surrounding vehicle are at locations on the high-definition map at a future moment. A probability value ranging from 0 to 1 may indicate location probability distribution of the target vehicle and the surrounding vehicle on the high-definition map. In the raster image corresponding to the high-definition map, the occupancy distribution map may also be referred to as an occupancy raster probability map.

Based on the foregoing descriptions of the technical solutions provided in this application, it is not difficult to learn that impact of the surrounding vehicle on the future trajectory of the target vehicle at the future moments can be more precisely indicated by using the interaction features between the target vehicle and the surrounding vehicle at the moments, especially at the future moments. The location probability distribution (ODM) of the target vehicle and the surrounding vehicle at the future moments is used as interaction features between the target vehicle and the surrounding vehicle, and the future trajectory of the target vehicle is predicted by using the temporal attention model, so that in a learning process, a neural network model can more easily predict the interaction representation between the target vehicle and the surrounding vehicle, and more easily determine the impact of the surrounding vehicle on the future trajectory of the target vehicle, to achieve high prediction precision. In addition, the location probability distribution (ODM) of the target vehicle and the surrounding vehicle is stored as an output result of a convolutional neural network at the beginning of the second phase. When an abnormal result is obtained during prediction of the future trajectory of the target vehicle, the abnormal result may be traced back based on the stored location probability distribution, so that the trajectory prediction method has high prediction precision and traceability.

Figure 4:
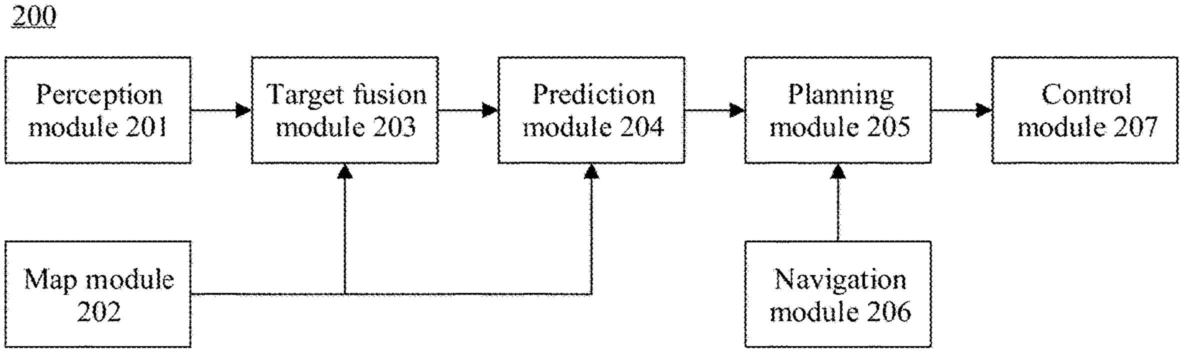
FIG. 4 is a diagram of a structure of an intelligent driving apparatus according to an embodiment of this application.

The following describes a diagram of a structure of an intelligent driving apparatus 200 configured to perform trajectory prediction according to an embodiment of this application. FIG. 4 is the diagram of the structure of the intelligent driving apparatus 200 used in an electronic device according to an embodiment of this application. As shown in FIG. 4, this terminal device includes a perception module 201, a map module 202, a target fusion module 203, a prediction module 204, a planning module 205, a navigation module 206, and a control module 207. The perception module 201 is configured to collect, by using a peripheral system (such as a sensor or a camera) of the electronic device, obstacle information, information about a surrounding environment in which the electronic device is located, traveling information of a target vehicle in which the electronic device is located, and traveling information of a surrounding vehicle of the target vehicle in which the electronic device is located. The obstacle information includes but is not limited to information such as a geographical location of an obstacle, a moving speed of the obstacle, a moving direction of the obstacle, a moving acceleration of the obstacle, a variance of the moving direction of the obstacle, and a variance of the moving speed of the obstacle. The obstacle includes but is not limited to a vehicle, a pedestrian, an animate obstacle, an inanimate obstacle, and the like. In this application, a pedestrian is used as an example of the obstacle to specifically describe some embodiments of this application. The map module 202 is configured to store a high-definition map. The high-definition map includes map information of the high-definition map on which a target vehicle and a surrounding vehicle are located. The map information includes but is not limited to map elements such as an intersection type, a lane line, a lane quantity, a travelable area, a zebra crossing, whether a road is congested, a traffic flow speed, a traffic flow acceleration, and a distance between a vehicle and the obstacle. The target fusion module 203 is configured to fuse the traveling information of the target vehicle, the traveling information of the surrounding vehicle, and road information, to obtain an interaction feature between the target vehicle and the surrounding vehicle. The prediction module 204 is configured to predict a future traveling trajectory of the target vehicle based on the interaction feature. The traveling information herein includes but is not limited to geographical locations, traveling speeds, traveling directions, and traveling accelerations of the target vehicle and the surrounding vehicle, and the distance between the vehicle and the obstacle.

The planning module 205 is configured to obtain a corresponding control policy based on the future traveling trajectory of the target vehicle, so that the determined control policy is subsequently used to control the target vehicle to travel. The control policy herein may be user-defined in advance on a driver terminal device side of the target vehicle, or may be generated based on a behavior intention. Details are described below. The control policy indicates to adjust a corresponding vehicle parameter for the vehicle, to implement safe driving of the vehicle.

The control module 207 is configured to correspondingly control and adjust, based on the control policy determined by the planning module 205, traveling of the target vehicle by using the navigation module 206. For example, vehicle parameters such as a steering wheel angle and the traveling speed of the target vehicle, whether to brake, and whether to press an accelerator pedal are controlled.

Figure 5:
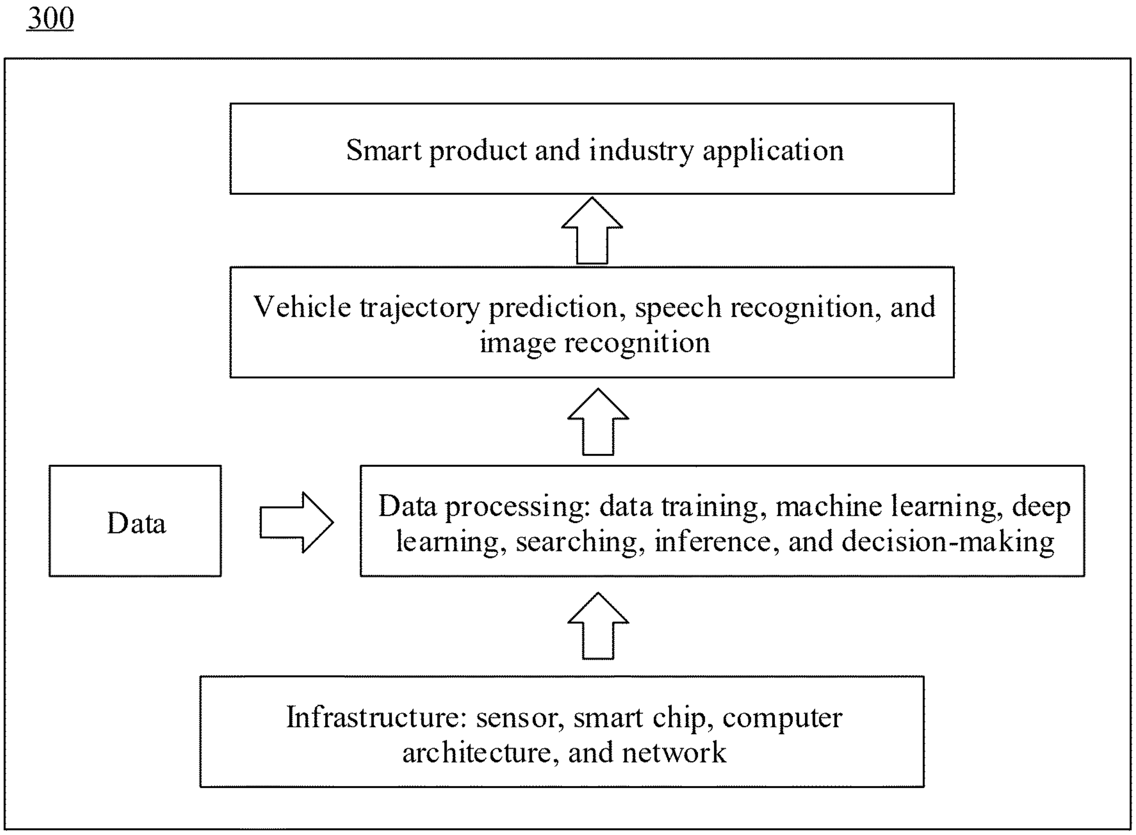
FIG. 5 is a diagram of a structure of an intelligent road prediction system according to an embodiment of this application.

The following describes an intelligent road prediction system 300 used to perform trajectory prediction in an embodiment of this application. The intelligent road prediction system 300 herein may be an artificial intelligence system. FIG. 5 is a diagram of a structure of the intelligent road prediction system 300. The intelligent road prediction system 300 may include three parts: infrastructure, data, and data processing.

The infrastructure provides computing capability support for the intelligent road prediction system 300, implements communication with the outside world, and implements support by using basic platforms. The infrastructure communicates with the outside by using sensors. A computing capability is provided by smart chips (hardware acceleration chips such as a CPU, an NPU, a GPU, an ASIC, and an FPGA). The basic platforms include related platforms, for example, a distributed computing framework and a network, for assurance and support. The basic platforms may include a cloud storage and computing network, an interconnection network, and the like. For example, the sensor communicates with the outside to obtain data, and the data is provided to the smart chip in a distributed computing system provided by the basic platform for computing.

Data at an upper layer of the infrastructure indicates a data source of the intelligent road prediction system 300. The data relates to a graph, an image, voice, and text, further relates to Internet of things data of a conventional device, and includes service data of an existing system and perception data such as force, displacement, a liquid level, a temperature, and humidity. Data processing usually includes manners of data training, machine learning, deep learning, searching, inference, decision-making, and the like. Machine learning and deep learning may perform symbolic and formalized intelligent information modeling, extraction, preprocessing, training, and the like on data. Inference is a process in which a human intelligent inference manner is simulated in a computer or an intelligent system, and machine thinking and problem resolving are performed by using formalized information based on an inference control policy. Typical functions are searching and matching. Decision-making is a process in which a decision is made after intelligent information is inferred, and usually provides functions such as classification, ranking, and prediction.

General capabilities are some general capabilities that may further be formed based on a data processing result. For example, the general capability may be an algorithm or a general system such as vehicle trajectory prediction, translation, text analysis, computer vision processing, speech recognition, and image recognition.

Smart products and industry applications are products and applications of the intelligent road prediction system 300 in various fields, and are package of an overall solution of the intelligent road prediction system 300, to productize and apply the intelligent road prediction system 300. Application fields of the intelligent road prediction system 300 mainly include smart terminals, smart transportation, autonomous driving, safe city, and the like.

Figure 6:
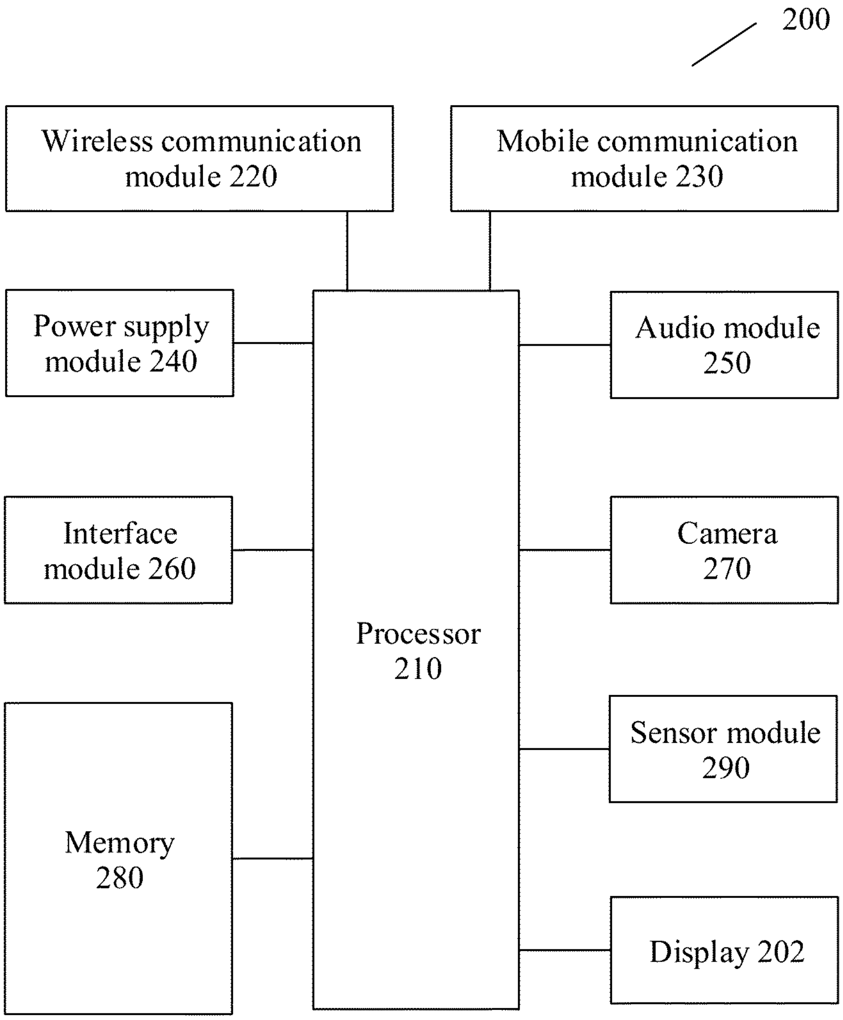
FIG. 6 is a diagram of a hardware structure of an intelligent driving apparatus according to an embodiment of this application.

The following describes, with reference to FIG. 6, a hardware structure of the intelligent driving apparatus 200 to which the technical solutions of this application are applicable. The intelligent driving apparatus 200 may perform the trajectory prediction method provided in this application. The technical solutions of this application may be alternatively applicable to another electronic device, and the another electronic device includes but is not limited to a tablet computer, a laptop computer, a desktop computer, a mobile terminal, or the like.

As shown in FIG. 6, the intelligent driving apparatus 200 may include a processor 210, a power module 240, a memory 280, a camera 270, a mobile communication module 230, a wireless communication module 220, a sensor module 290, an audio module 250, an interface module 260, a display 202, and the like.

The processor 210 may include one or more processing units, for example, may include a processing module or a processing circuit of a central processing unit (CPU), a graphics processing unit (GPU), a digital signal processor (DSP), a microprocessor (Micro-programmed Control Unit, MCU), an artificial intelligence (AI) processor, a programmable logic device (FPGA), or the like. Different processing units may be independent devices, or may be integrated into one or more processors.

For example, in some instances of this application, the processor 210 may be configured to perform a process of predicting a future trajectory of a target vehicle 100. The process includes: obtaining map information of a high-definition map, a historical trajectory of the target vehicle 100, and a historical trajectory of a surrounding vehicle; and fusing the map information of the high-definition map, the historical trajectory of the target vehicle 100, and the historical trajectory of the surrounding vehicle, to obtain the future trajectory of the target vehicle 100.

The memory 280 may be configured to store data, a software program, and a module. The memory 280 may be a volatile memory such as a random-access memory (RAM), may be a non-volatile memory such as a read-only memory (ROM), a flash memory, a hard disk drive (HDD), or a solid-state drive (SSD), may be a combination of the foregoing types of memories, or may be a removable storage medium such as a secure digital (SD) storage card. Specifically, the memory 280 may include a program storage area (not shown in the figure) and a data storage area (not shown in the figure). The program storage area may store program code. The program code is used to enable the processor 210 to execute the program code to perform the trajectory prediction method provided in embodiments of this application.

The power module 240 may include a power supply, a power management component, and the like. The power supply may be a battery. The power management component is configured to manage charging of the power supply and power supplying to another module performed by the power supply. A charging management module is configured to receive charging input from a charger. The power management module is configured to connect to the power supply, the charging management module and the processor 210.

The mobile communication module 230 may include but is not limited to an antenna, a power amplifier, a filter, a low noise amplifier (LNA), and the like. The mobile communication module 230 may provide a wireless communication solution that is applied to the intelligent driving apparatus 200 and that includes 2G/3G/4G/5G and the like. The mobile communication module 230 may receive an electromagnetic wave through the antenna, perform processing such as filtering and amplification on the received electromagnetic wave, and transmit the processed electromagnetic wave to a modem processor for demodulation. The mobile communication module 230 may further amplify a signal modulated by the modem processor, and convert the amplified signal into an electromagnetic wave for radiation through the antenna. In some embodiments, at least some functional modules in the mobile communication module 230 may be disposed in the processor 210. In some embodiments, the at least some functional modules of the mobile communication module 230 may be disposed in a same device as at least some modules of the processor 210.

The wireless communication module 220 may include an antenna, and receive and send an electromagnetic wave through the antenna. The wireless communication module 220 may provide a wireless communication solution that is applied to the intelligent driving apparatus 200 and that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like. The intelligent driving apparatus 200 may communicate with a network and another device by using a wireless communication technology.

In some embodiments, the mobile communication module 230 and the wireless communication module 220 of the intelligent driving apparatus 200 may also be located in a same module.

The camera 270, for example, a depth camera, is configured to photograph a face image, so that the processor 210 can determine a current viewing location of the user based on the face image. An optical image of an object is generated through a lens, and is projected onto a photosensitive element. The photosensitive element converts an optical signal into an electrical signal, and then transmits the electrical signal to an ISP (image signal processor) to convert the electrical signal into a digital image signal. The intelligent driving apparatus 200 may implement a photographing function by using the ISP, the camera 270, a video codec, the GPU (graphic processing unit), the display 202, an application processor, and the like.

The display 202 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In this embodiment of this application, the display 202 may be configured to display the high-definition map, and display the predicted future trajectory of the target vehicle 100 on the high-definition map.

The sensor module 290 may include an optical proximity sensor, a pressure sensor, a gyroscope sensor, a barometric pressure sensor, a magnetic sensor, an acceleration sensor, a distance sensor, a fingerprint sensor, a temperature sensor, a touch sensor, an ambient light sensor, a bone conduction sensor, and the like.

The audio module 250 may convert digital audio information into an analog audio signal for output, or convert analog audio input into a digital audio signal. The audio module 250 may further be configured to encode and decode an audio signal. In some embodiments, the audio module 250 may be disposed in the processor 210, or some functional modules in the audio module 250 are disposed in the processor 210. In some embodiments, the audio module 250 may include a speaker, a receiver, a microphone, and a headset jack.

The interface module 260 includes an external memory interface, a universal serial bus (USB) interface, a subscriber identity module (SIM) card interface, and the like.

In some embodiments, the intelligent driving apparatus 200 further includes a button, an indicator, and the like. The button may include a volume button, a power-on/power-off button, and the like. The indicator may include a laser indicator, a radio frequency indicator, an LED indicator, and the like.

It may be understood that the structure shown in FIG. 6 does not constitute a specific limitation on the intelligent driving apparatus 200. In some other embodiments of this application, the intelligent driving apparatus 200 may include more or fewer components than those shown in FIG. 6, or some components may be combined, or some components may be split, or components may be arranged in different manners. The components shown in FIG. 6 may be implemented by hardware, software, or a combination of software and hardware.

To better describe the technical solutions of this application, the following describes a trajectory prediction method provided in some embodiments of this application with reference to a flowchart shown in FIG. 7 and FIG. 8 to FIG. 10.

Figure 7:
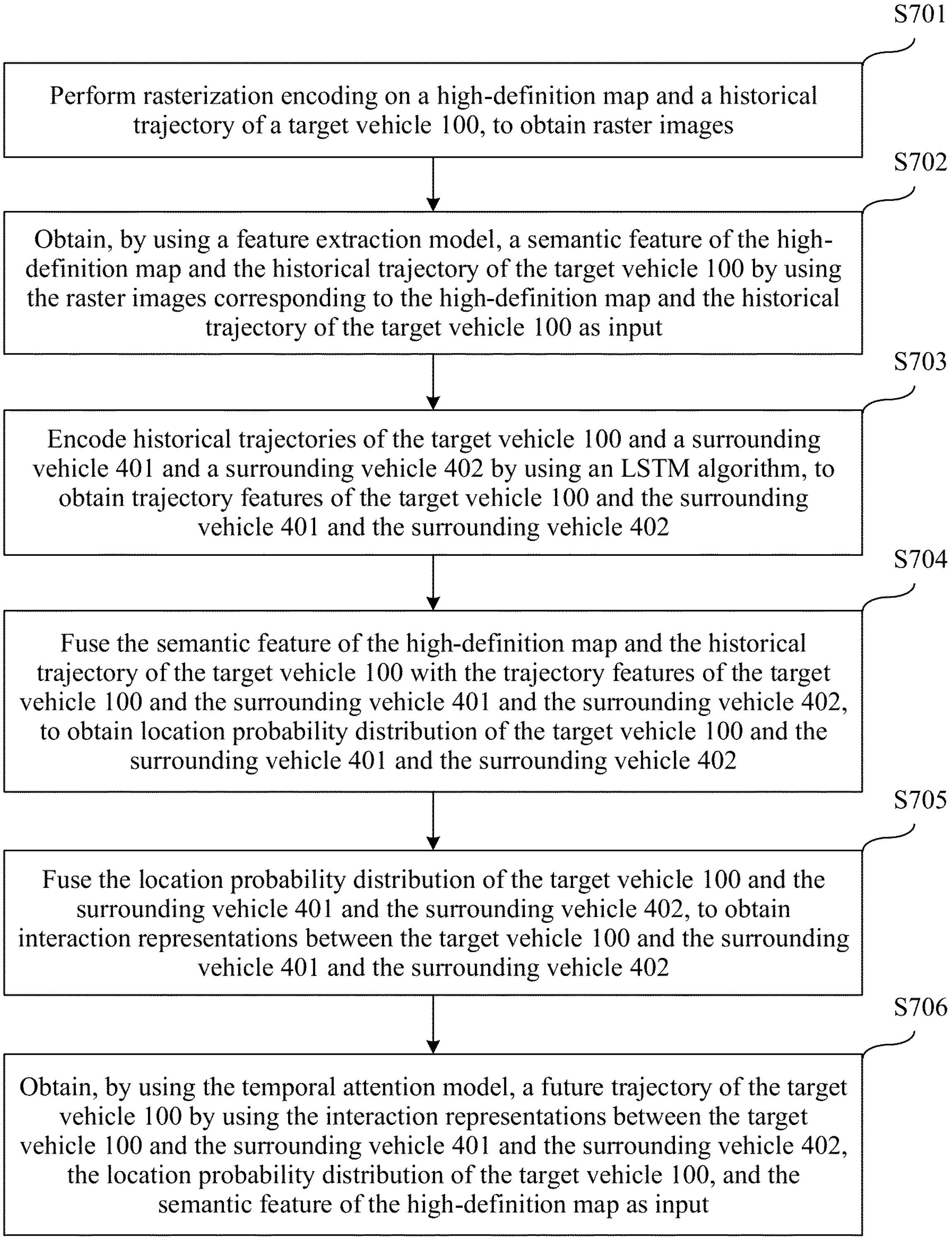
FIG. 7 is a schematic flowchart of a trajectory prediction method according to an embodiment of this application.

All steps in the flowchart shown in FIG. 7 are performed by the intelligent driving apparatus 200 disposed in the target vehicle 100. Specifically, the flowchart shown in FIG. 7 includes the following steps.

S701: Perform rasterization encoding on a high-definition map and a historical trajectory of the target vehicle 100, to obtain raster images.

In this embodiment of this application, the high-definition map herein may be a two-dimensional high-definition map including the target vehicle 100, that is, the high-definition map on which the target vehicle 100 is traveling. A current location of the target vehicle 100 is used as an origin of a two-dimensional xy coordinate system. A current orientation of the target vehicle 100 is a direction of the y-axis in the coordinate system. A range of 120 meters forward and 40 meters backward from the target vehicle 100 to 80 meters on the left and 80 meters on the right of the target vehicle 100 is selected as the high-definition map, that is, a size of the high-definition map is 160 meters*160 meters. The high-definition map may include map information such as lane centerlines and lane borderlines of a lane on which the target vehicle 100 travels or a surrounding lane, a pedestrian crosswalk, and a travelable area.

A process of performing rasterization encoding on the high-definition map includes: determining a size of each raster in the raster image, and encoding each piece of map information of the high-definition map to a layer that is in the raster image and that corresponds to each piece of map information, that is, assigning a value to each raster in the raster image. For example, each raster is 0.5 meters*0.5 meters. For the high-definition map whose size is 160 meters*160 meters, a resolution of the raster image corresponding to the high-definition map obtained by performing rasterization encoding is 320*320. The lane centerline is used as an example. At a layer corresponding to the lane centerline in the raster image, rasters that the lane line passes through are filled with a raster value of 1, and remaining rasters are filled with a raster value of 0.

In embodiments of this application, the historical trajectory of the target vehicle 100 may be obtained from a sensor (for example, a GPS sensor) of the target vehicle 100. The historical trajectory of the target vehicle 100 may be location information of the target vehicle 100 on the high-definition map at a plurality of consecutive moments S. For example, values of S herein may be (0, 1, 2, . . . , S), which indicate S pieces of location information of the target vehicle 100. The historical trajectory of the target vehicle 100 is encoded, by using the same manner of rasterization encoding as that used for the high-definition map, into a layer that is in the raster image and that corresponds to the historical trajectory of the target vehicle 100. Rasters that the historical trajectory of the target vehicle 100 passes through are filled with a raster value of 1, and remaining rasters are filled with a raster value of 0. A resolution of the raster image corresponding to the historical trajectory of the target vehicle 100 may be the same as or different from the resolution of the raster image corresponding to the high-definition map. For example, the resolution of the raster image corresponding to the historical trajectory of the target vehicle 100 may be 20*20 or 40*40.

It may be understood that, in another embodiment of this application, the historical trajectory of the target vehicle 100 may also be obtained from a video including the target vehicle 100. A process thereof includes: performing processing on the video by using a convolutional neural network (CNN), to obtain the location information of the target vehicle 100 at the plurality of consecutive moments S (a plurality of frames in a video stream).

S702: Obtain, by using a feature extraction model, a semantic feature of the high-definition map and the historical trajectory of the target vehicle 100 by using the raster images corresponding to the high-definition map and the historical trajectory of the target vehicle 100 as input.

Figure 8:
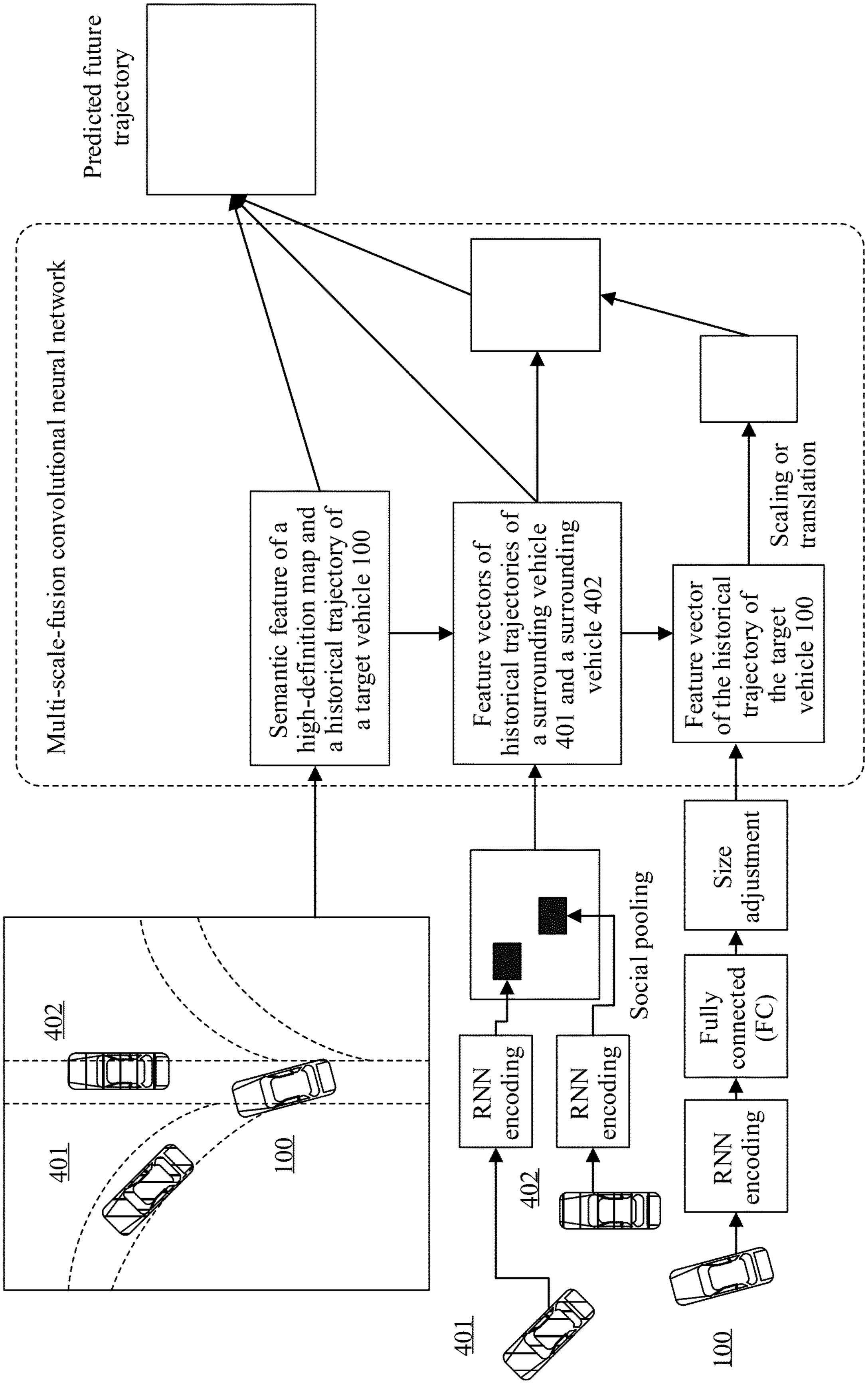
FIG. 8 is a diagram of fusing map information and feature information of a target vehicle and a surrounding vehicle according to an embodiment of this application.

In this embodiment of this application, refer to FIG. 8. FIG. 8 is a diagram of fusing the high-definition map, the historical trajectory of the target vehicle 100, and historical trajectories of the target vehicle 100 and a surrounding vehicle 401 and a surrounding vehicle 402, to obtain location probability distribution of the target vehicle 100 and the surrounding vehicle 401 and the surrounding vehicle 402. For the raster images corresponding to the high-definition map and the historical trajectory of the target vehicle 100, the raster images are used as input, and the raster images corresponding to the high-definition map and the historical trajectory of the target vehicle 100 are fused by using a multi-scale-fusion convolutional neural network (multi-scale-fusion CNN, MSF-CNN), to obtain the semantic feature that is of the high-definition map and the historical trajectory of the target vehicle 100 and that has a unified resolution. For example, CNN encoding is performed on the input raster images corresponding to the high-definition map and the historical trajectory of the target vehicle 100 to obtain a smaller resolution, for example, a size of 20*20, then CNN decoding is performed to obtain a larger resolution, for example, 160*160, and the raster images that have the unified resolution and that are obtained by performing encoding and decoding are fused.

S703: Encode the historical trajectories of the target vehicle 100 and the surrounding vehicle 401 and the surrounding vehicle 402 by using an LSTM algorithm, to obtain trajectory features of the target vehicle 100 and the surrounding vehicle 401 and the surrounding vehicle 402.

In this embodiment of this application, for the surrounding vehicle 401 and the surrounding vehicle 402, the historical trajectories of the surrounding vehicle 401 and the surrounding vehicle 402 may be obtained from historical traveling trajectory information that is of the surrounding vehicle 401 and the surrounding vehicle 402 and that is obtained and recorded by using the sensor of the target vehicle 100. Alternatively, the historical trajectories of the surrounding vehicle 401 and the surrounding vehicle 402 may be the location information of the target vehicle 100 on the high-definition map at the plurality of consecutive moments.

Still refer to FIG. 8. A process of obtaining the trajectory feature of the surrounding vehicle 401 and the surrounding vehicle 402 includes: converting the historical trajectories of the surrounding vehicle 401 and the surrounding vehicle 402 into coordinates in the coordinate system of the target vehicle 100, and obtaining feature vectors of the surrounding vehicle 401 and the surrounding vehicle 402 through LSTM network encoding; and fusing the feature vectors of the surrounding vehicle 401 and the surrounding vehicle 402 through social pooling, to obtain a fused feature vector of the surrounding vehicle 401 and the surrounding vehicle 402, that is, the trajectory feature of the surrounding vehicle 401 and the surrounding vehicle 402.

In this embodiment of this application, the historical trajectories of the surrounding vehicle 401 and the surrounding vehicle 402 may be preprocessed to obtain locations corresponding to the historical trajectories in the coordinate system corresponding to the target vehicle 100. The locations corresponding to the historical trajectories of the surrounding vehicle 401 and the surrounding vehicle 402 herein may be moving trajectories generated by relative displacement between the surrounding vehicle 401 and the surrounding vehicle 402 and the target vehicle 100, and indicate that the historical trajectory of the target vehicle 100 is affected by traveling routes of the surrounding vehicle 401 and the surrounding vehicle 402. The relative displacement of the surrounding vehicle 401 and the surrounding vehicle 402 is added to the historical trajectory of the target vehicle 100, to indicate displacement compensation of the surrounding vehicle 402 and the target vehicle 100 for the historical trajectory of the target vehicle 100, and is further used to predict a future traveling trajectory of the target vehicle 100 after the target vehicle 100 is affected by the surrounding vehicle 402 and the target vehicle 100.

Figure 9:
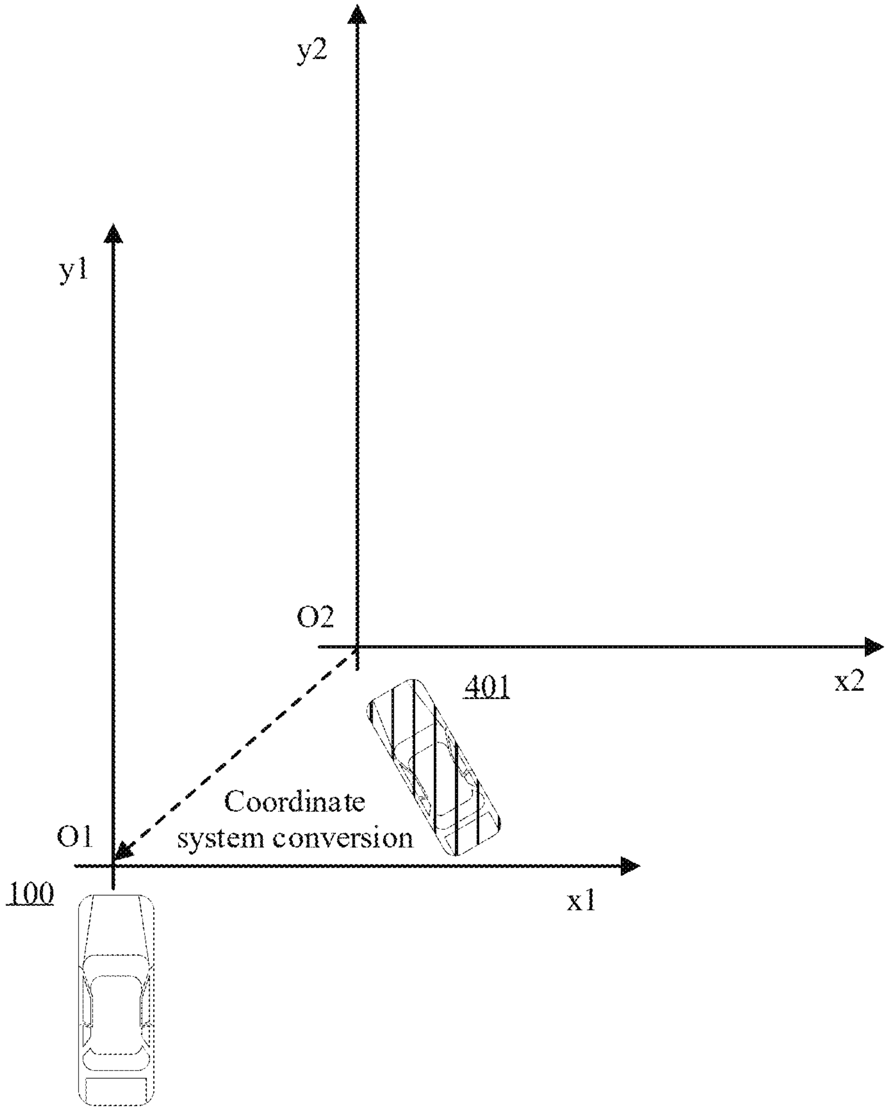
FIG. 9 is a diagram of a location relationship between historical trajectories of a target vehicle and a surrounding vehicle according to an embodiment of this application.

In this embodiment of this application, FIG. 9 is a diagram of corresponding locations between the historical trajectories of the target vehicle 100 and the surrounding vehicle 401 according to an embodiment of this application. As shown in FIG. 9, O1 is the origin of the coordinate system of the target vehicle 100, and O2 is a current location of the surrounding vehicle 401. The historical trajectory of the surrounding vehicle 401 is converted into coordinates in the coordinate system of the target vehicle 100 by using O2 as an origin of coordinates. That is, the coordinate system with O2 as the origin of coordinates is converted to the coordinate system with O1 as the origin of coordinates.

In this embodiment of this application, for the target vehicle 100, the historical trajectory of the target vehicle 100 may be the same as the historical trajectory of the target vehicle 100 in step S701, that is, the historical trajectory may be the location information that is obtained and recorded by using the sensor of the target vehicle 100 and that is on the high-definition map at the plurality of consecutive moments.

Still refer to FIG. 8. A process of obtaining the trajectory feature of the target vehicle 100 includes: converting the historical trajectory of the target vehicle 100 into coordinates in the coordinate system of the target vehicle 100, obtaining the trajectory feature (feature vector) through LSTM network encoding, inputting the feature vector into a fully connected layers (FC), and performing adjustment (size adjustment) on a resolution of the feature vector, to obtain an adjusted trajectory feature of the target vehicle 100. It may be understood that, for the adjusted trajectory feature of the target vehicle 100, before the trajectory feature is fused with the semantic feature that is of the high-definition map and the historical trajectory of the target vehicle 100 and that is obtained in step S702, a resolution of the trajectory feature further needs to be adjusted, which includes: adjusting the resolution of the trajectory feature of the target vehicle 100 through scaling or translation (spatial transformer). For example, 40*40 is adjusted to 80*80, so that the trajectory feature of the target vehicle 100 is fused with the semantic feature that is of the high-definition map and the historical trajectory of the target vehicle 100 and that is obtained in step S702.

The long short-term memory (LSTM) network algorithm is a specific form of recurrent neural network (RNN), and the RNN is a general term for a series of neural networks that can process sequence data. The RNN further has many variants, for example, a bidirectional RNN. However, the RNN has great difficulty in dealing with long-term dependencies (nodes that are far away from each other in a time sequence): When connections between the nodes that are far away from each other are calculated, a plurality of multiplications of Jacobian matrix may be performed, and consequently a problem of gradient disappearance (which frequently occurs) or gradient expansion (which rarely occurs) is caused. To resolve this problem, a gated RNN (Gated RNN) is most widely used, and the LSTM is one of the most famous among the gated RNNs. A leaky unit allows, by designing a weight coefficient between connections, the RNN to accumulate long-term connections between the nodes that are far away from each other. The gated RNN generalizes this idea, allows the coefficient to be changed at different moments, and allows a network to forget information that has been accumulated. The LSTM is such a gated RNN. The LSTM adds an input gate, a forget gate, and an output gate, so that a self-loop weight changes. In this way, when a model parameter is unchanged, an integral scale may dynamically change at different moments, so that the problem of gradient disappearance or gradient expansion is avoided.

S704: Fuse the semantic feature of the high-definition map and the historical trajectory of the target vehicle 100 with the trajectory features of the target vehicle 100 and the surrounding vehicle 401 and the surrounding vehicle 402, to obtain the location probability distribution of the target vehicle 100 and the surrounding vehicle 401 and the surrounding vehicle 402.

In this embodiment of this application, a process of fusing the trajectory feature that is of the surrounding vehicle 401 and the surrounding vehicle 402 and that is obtained in step S703 with the semantic feature of the high-definition map and the historical trajectory of the target vehicle 100 may include: calculating raster locations of the feature vector of the surrounding vehicle 401 and the surrounding vehicle 402 in the fused semantic feature that is of the high-definition map and the historical trajectory of the target vehicle 100 and that is obtained in step S702, and after the feature vector of the surrounding vehicle 401 and the surrounding vehicle 402 is filled into the corresponding raster locations, fusing the feature vector with the semantic feature that is of the high-definition map and the historical trajectory of the target vehicle 100 and that is obtained in step S702, that is, performing fusion by using the multi-scale-fusion convolutional neural network in step S702. For example, a resolution of the semantic feature that is of the high-definition map and the historical trajectory of the target vehicle 100 and that is obtained in step S702 is 160*160. Rasters of the feature vector of the surrounding vehicle 401 and the surrounding vehicle 402 in the resolution 160*160 are calculated, and the feature vector is filled into the corresponding raster locations.

Similarly, for the trajectory feature of the target vehicle 100, the trajectory feature of the target vehicle 100 is fused with the semantic feature that is of the high-definition map and the historical trajectory of the target vehicle 100 and that is obtained in step S702.

It may be understood that, after the semantic feature of the high-definition map and the historical trajectory of the target vehicle 100 is fused with the trajectory features of the target vehicle 100 and the surrounding vehicle 401 and the surrounding vehicle 402, the location probability distribution, that is, an ODM or a future occupancy raster probability map, of the target vehicle 100 and the surrounding vehicle 401 and the surrounding vehicle 402 at the future moments may be obtained. A resolution of the location probability distribution herein may be the same as the resolution of the semantic feature that is of the high-definition map and the historical trajectory of the target vehicle 100 in step S702 and that has the unified resolution. For example, location probability distribution at future Tn moments is obtained by performing step S704, and outputs of step S704 are T feature maps whose sizes are 160*160. Tn (T1 to Tn) is a predicted quantity of the future moments. The T feature maps indicate ODMs at the future moments, that is, future occupancy raster probability maps.

It may be understood that steps S701 to S704 are performed, that is, location relationship conversion between the vehicles and a pooling operation are performed, to establish the location probability distribution of the vehicles, including the target vehicle 100, the surrounding vehicle 401, and the surrounding vehicle 402, at the future moments. Next, interaction features between the vehicles are generated by using the location probability distribution of the vehicles. One of the vehicles (the target vehicle 100) is used as an example. The location probability distribution of other vehicles (the surrounding vehicle 401 and the surrounding vehicle 402) around the target vehicle 100 is converted into coordinates in the coordinate system of the target vehicle 100, and a maximum pooling method is used to obtain the interaction features between the target vehicle 100 and the surrounding vehicle 401 and the surrounding vehicle 402, that is, occupancy probability distribution, at the future moments (the future Tn moments), of rasters in the raster image corresponding to the high-definition map.

S705: Fuse the location probability distribution of the target vehicle 100 and the surrounding vehicle 401 and the surrounding vehicle 402, to obtain the interaction features between the target vehicle 100 and the surrounding vehicle 401 and the surrounding vehicle 402.

In this embodiment of this application, the interaction features herein indicate occupancy probability distribution of the target vehicle 100 and the surrounding vehicle 401 and the surrounding vehicle 402 at the future moments (the future Tn moments) in the rasters in the raster image corresponding to the high-definition map.

A process of fusing the location probability distribution of the target vehicle 100 and the surrounding vehicle 401 and the surrounding vehicle 402 includes: selecting the target vehicle 100, separately obtaining the location probability distribution of the vehicles around the target vehicle 100, namely, the surrounding vehicle 401 and the surrounding vehicle 402, calculating coordinate conversion from the surrounding vehicle 401 and the surrounding vehicle 402 to the target vehicle 100, converting the location probability distribution of the surrounding vehicle 401 and the surrounding vehicle 402 into coordinates in the target coordinate system of the target vehicle 100, and combining the location probability distribution of the surrounding vehicle 401 and the surrounding vehicle 402 at the future moments (the future Tn moments), to obtain location probability distribution with a dimension of m*h*w. m herein is a quantity of all the vehicles, and h and w are respectively a length and a width of the location probability distribution. Maximum pooling is performed on the location probability distribution with the dimension of m*h*w, to obtain combined location probability distribution with a dimension of h*w, which is used as interaction features of the target vehicle 100, that is, occupancy probability distribution, at the future moments, of rasters around a raster in which the target vehicle 100 is in the raster image corresponding to the high-definition map on which the target vehicle 100 is located. The target vehicle 100, the surrounding vehicle 401, and the surrounding vehicle 402 are used as examples. Herein, m is 3, and h and w are separately 160.

It may be understood that, after the interaction features between the target vehicle 100 and the surrounding vehicle 401 and the surrounding vehicle 402 and the occupancy probability distribution, at the future moments (the future Tn moments), of the rasters around the target vehicle 100 in the raster image corresponding to the high-definition map are obtained in step S705, the interaction features of the target vehicle 100 at the future moments, the location probability distribution of the surrounding vehicle 401 and the surrounding vehicle 402, and the map information of the high-definition map are used as input, to predict a future trajectory of the target vehicle 100 by using a temporal attention model.

S706: Obtain, by using the temporal attention model, the future trajectory of the target vehicle 100 by using the interaction features between the target vehicle 100 and the surrounding vehicle 401 and the surrounding vehicle 402, the location probability distribution of the target vehicle 100, and the semantic feature of the high-definition map as input.

In this embodiment of this application, a process of fusing the interaction features between the target vehicle 100 and the surrounding vehicle 401 and the surrounding vehicle 402 at the future moments, the location probability distribution of the target vehicle 100, and the semantic feature of the high-definition map may include: obtaining, through CNN network encoding by using the interaction features between the target vehicle 100 and the surrounding vehicle 401 and the surrounding vehicle 402 at the future moments, the location probability distribution of the target vehicle 100, and the semantic feature of the high-definition map as input, feature vectors that are at the future moments and that correspond to the interaction features between the target vehicle 100 and the surrounding vehicle 401 and the surrounding vehicle 402 at the future moments, the location probability distribution of the target vehicle 100, and the semantic feature of the high-definition map. The feature vectors at the future moments are fused by using a multi-head self-attention (MHSA) model, and locations of the target vehicle 100 at the future moments, that is, the future trajectory of the target vehicle 100 at the future moments (the future Tn moments), are obtained through a fully connected layers (FC).

Figure 10:
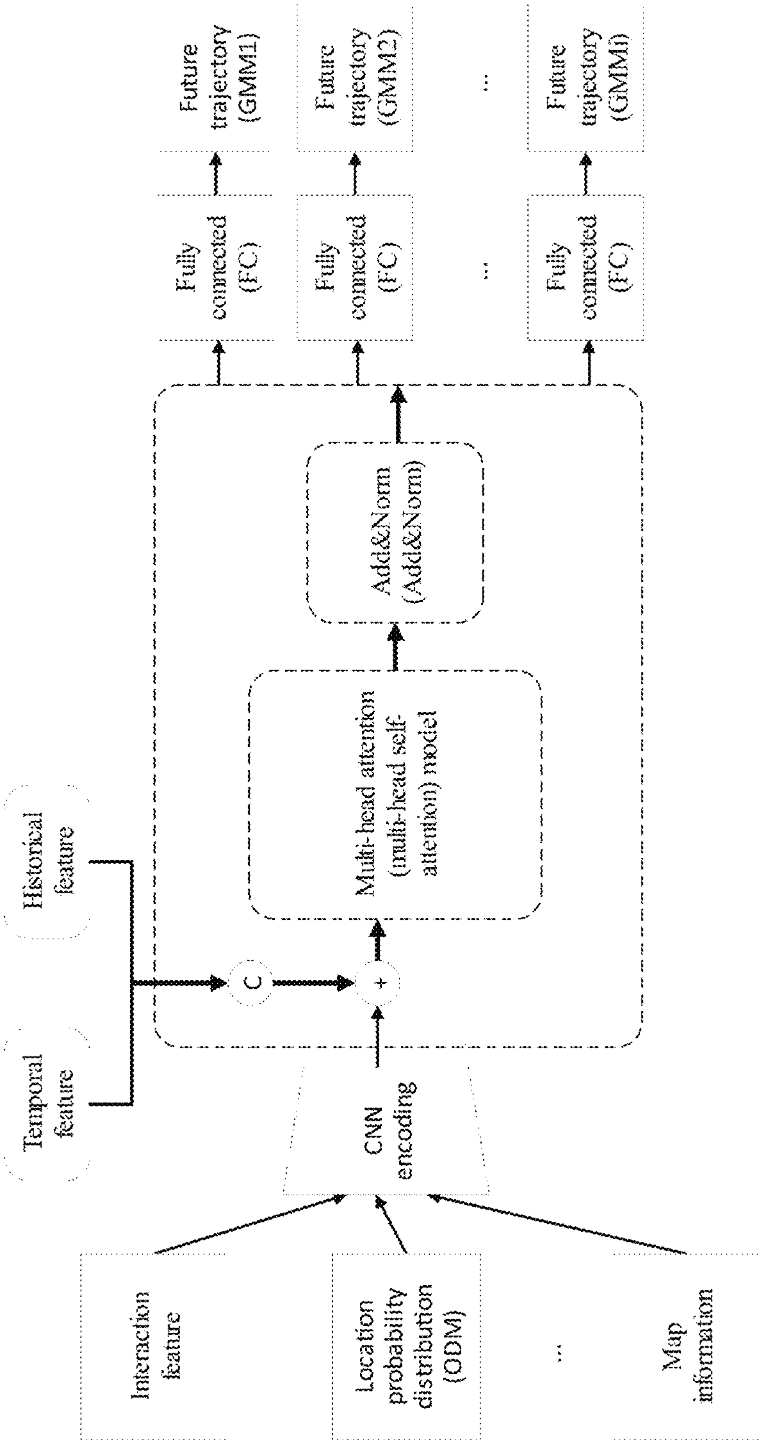
FIG. 10 is a diagram of fusing an interaction representation between a target vehicle and a surrounding vehicle, location probability distribution of the target vehicle, and map information according to an embodiment of this application.

FIG. 10 is a diagram of the process of fusing the interaction features between the target vehicle 100 and the surrounding vehicle 401 and the surrounding vehicle 402 at the future moments, the location probability distribution of the target vehicle 100, and the semantic feature of the high-definition map according to an embodiment of this application. First, the interaction features between the target vehicle 100 and the surrounding vehicle 401 and the surrounding vehicle 402 at the future moments, the location probability distribution of the target vehicle 100, and the semantic feature of the high-definition map are used as input, to obtain, through CNN network encoding, feature vectors of the target vehicle 100 at the future moments, where the feature vectors are denoted as K and V. The feature vectors of the target vehicle 100 at the future moments are added with encoding vectors of a temporal feature (time encoder) and a historical feature (agent history). One-hot encoding is used for the temporal feature herein, and the historical feature is a feature vector obtained by performing LSTM network encoding on the historical trajectory of the target vehicle 100. After Add&Norm is separately performed on Q, K and V, the following formula is used (dk herein is a conversion coefficient, and softmax is a loss function) to obtain a fused feature of the target vehicle 100 at the future moments:

$$h = Softmax\left(\frac{QK^T}{\sqrt{d_k}}\right)V$$

Finally, location representations of the target vehicle 100 at the future moments are obtained through the fully connected layers (FC), that is, the future trajectory of the target vehicle 100 at the future moments may be indicated by using Gaussian mixed model (GMM) distribution.

Add in the Add&Norm processing (Add&Norm) herein indicates a residual connection (RC). A part of information of a previous layer is transferred to a next layer without any difference, so that model performance can be effectively improved. Norm represents normalization (layer normalization, LN). An activation value is normalized to accelerate model training and model convergence.

It may be understood that the values described in FIG. 7 are all examples. In some other embodiments, other values may alternatively be used. An execution sequence from S701 to S706 is merely an example. In some other embodiments, another execution sequence may be used, or some steps may be split or combined. This is not limited herein.

An embodiment of this application further provides a computer-readable storage medium. The computer-readable storage medium stores a computer program. When the computer program is executed by a processor, steps in the foregoing embodiments of the trajectory prediction methods can be implemented.

An embodiment of this application further provides a computer program product. When the computer program product is run on an electronic device, the electronic device is enabled to implement steps in the foregoing embodiments of the trajectory prediction methods.

An embodiment of this application further provides an electronic device. The electronic device includes at least one processor, a memory, and a computer program that is stored in the memory and that can run on the at least one processor. When executing the computer program, the processor implements the steps in the foregoing trajectory prediction method embodiments.

Embodiments of a mechanism disclosed in this application may be implemented in hardware, software, firmware, or a combination of these implementations. Embodiments of this application may be implemented as a computer program or program code executed in a programmable system. The programmable system includes at least one processor, a storage system (including a volatile memory, a nonvolatile memory, and/or a storage element), at least one input device, and at least one output device.

The program code may be used for inputting instructions, to perform functions described in this application and generate output information. The output information may be applied to one or more output devices in a known manner. For a purpose of this application, a processing system includes any system that has a processor such as a digital signal processor (DSP), a microcontroller, an application-specific integrated circuit (ASIC), or a microprocessor.

The program code may be implemented in a high-level procedural language or an object-oriented programming language, to communicate with the processing system. The program code may be alternatively implemented in an assembly language or a machine language when needed. Actually, the mechanism described in this application is not limited to a scope of any particular programming language. In any case, the language may be a compiled language or an interpreted language.

In some cases, disclosed embodiments may be implemented by hardware, firmware, software, or any combination thereof. Disclosed embodiments may be alternatively implemented by using instructions carried by or stored on one or more temporary or non-temporary machine-readable (for example, computer-readable) storage media, and the instructions may be read and executed by one or more processors. For example, the instructions may be distributed through a network or another computer-readable medium. Therefore, the machine-readable medium may include any mechanism for storing or transmitting information in a machine-readable (for example, a computer-readable) form. The machine-readable medium includes but is not limited to a floppy disk, a compact disc, an optical disc, a read-only memory (CD-ROM), a magneto-optical disc, a read-only memory (ROM), a random access memory (RAM), an erasable programmable read-only memory (EPROM), an electrically erasable programmable read-only memory (EEPROM), a magnetic or optical card, a flash memory, or a tangible machine-readable memory that is configured to transmit information (for example, a carrier, an infrared signal, or a digital signal) by using a propagating signal in an electrical, optical, acoustic, or another form over the Internet. Therefore, the machine-readable medium includes any type of machine-readable medium that is suitable for storing or transmitting electronic instructions or information in a machine-readable (for example, a computer-readable) form.

In the accompanying drawings, some structural or method features may be shown in a particular arrangement and/or order. However, it should be understood that such a particular arrangement and/or order may not be needed. In some embodiments, these features may be arranged in a manner and/or order different from those/that shown in the descriptive accompanying drawings. In addition, inclusion of the structural or method features in a particular figure does not imply that such features are needed in all embodiments, and in some embodiments, these features may not be included or may be combined with other features.

It should be noted that all units/modules mentioned in device embodiments of this application are logical units/modules. Physically, one logical unit/module may be one physical unit/module, may be a part of one physical unit/module, or may be implemented by using a combination of a plurality of physical units/modules. Physical implementations of these logical units/modules are not the most important, and a combination of functions implemented by these logical units/modules is a key to resolving technical issues proposed in this application. In addition, to highlight an innovative part of this application, a unit/module that is not closely related to resolving the technical issues proposed in this application is not introduced in the foregoing device embodiments of this application. This does not mean that there are no other units/modules in the foregoing device embodiments.

It should be noted that in the examples and the specification of this patent, relational terms such as first and second are used only to differentiate an entity or operation from another entity or operation, and do not require or imply that any actual relationship or sequence exists between these entities or operations. Moreover, the terms "include" and "comprise", or any of their variants are intended to cover a non-exclusive inclusion, so that a process, method, article, or device that includes a list of elements not only includes those elements but also includes other elements that are not expressly listed, or further includes elements inherent to such process, method, article, or device. An element preceded by a statement "include a" does not, without more constraints, preclude the presence of additional identical elements in the process, method, article, or device that includes the element.

Although this application has been illustrated and described with reference to some embodiments of this application, a person of ordinary skill in the art should understand that various changes may be made to this application in form and detail without departing from the spirit and scope of this application.

What is claimed is:

1. A vehicle trajectory prediction method, applied to an electronic device, wherein the method comprises:

obtaining historical trajectory information of a target vehicle and an associated vehicle of the target vehicle;

performing feature extraction on map information corresponding to a traveling environment of the target vehicle and the associated vehicle, to obtain a semantic feature indicating the map information, wherein the semantic feature of the map information comprises a lane and a travelable area in the traveling environment;

obtaining, in a processing manner, location distribution information of the target vehicle and location distribution information of the associated vehicle in a preset future time period by using the semantic feature of the map information and the historical trajectory information as input;

determining an interaction feature between the target vehicle and the associated vehicle in the preset future time period based on the location distribution information; and determining a traveling trajectory of the target vehicle in the preset future time period based on the interaction feature, the location distribution information of the target vehicle in the preset future time period, and the map information.

2. The method according to claim 1, wherein the associated vehicle comprises at least one of a vehicle on a lane adjacent to a lane on which the target vehicle is located in the traveling environment of the target vehicle or a vehicle on the same lane as the target vehicle.

3. The method according to claim 2, wherein the historical trajectory information comprises at least one of location information of the target vehicle and the associated vehicle obtained by the target vehicle by using a sensor, or location information of the target vehicle and the associated vehicle in a map corresponding to the traveling environment.

4. The method according to claim 3, wherein the obtaining historical trajectory information of a target vehicle and an associated vehicle of the target vehicle further comprises:

obtaining, in a first processing manner, a feature vector of the historical trajectory information by using the historical trajectory information as input.

5. The method according to claim 4, wherein the first processing manner comprises: encoding the historical trajectory information by using a long short-term memory (LSTM) algorithm, to obtain the feature vector indicating the historical trajectory information.

6. The method according to claim 4, wherein the processing manner comprises: fusing the semantic feature of the map information and the feature vector of the historical trajectory information, to obtain the location distribution information.

7. The method according to claim 1, wherein the interaction feature indicates at least one of the following: in the preset future time period, the associated vehicle cuts in front of or gives way to the target vehicle, and the target vehicle avoids or accelerates past the associated vehicle.

8. The method according to claim 1, wherein the determining an interaction feature between the target vehicle and the associated vehicle in the preset future time period based on the location distribution information comprises:

fusing the location distribution information of the target vehicle and the location distribution information of the associated vehicle in the preset future time period based on a location relationship between a current location of the target vehicle and a current location of the associated vehicle in the traveling environment, to obtain the interaction feature between the target vehicle and the associated vehicle in the preset future time period.

9. The method according to claim 8, wherein the fusing the location distribution information of the target vehicle and the location distribution information of the associated vehicle in the preset future time period comprises:

performing encoding by using a convolutional neural network (CNN) algorithm by using the location distribution information of the target vehicle and the location distribution information of the associated vehicle in the preset future time period as input, to obtain feature vectors corresponding to the location distribution information of the target vehicle and the location distribution information of the associated vehicle; and fusing, by using a fusion model, the feature vectors corresponding to the location distribution information of the target vehicle and the location distribution information of the associated vehicle.

10. The method according to claim 1, wherein the determining a traveling trajectory of the target vehicle in the preset future time period based on the interaction feature, the location distribution information of the target vehicle in the preset future time period, and the map information comprises:

fusing the interaction feature, the location distribution information of the target vehicle in the preset future time period, and the map information by using a multi-head self-attention model, to obtain the traveling trajectory of the target vehicle in the preset future time period, wherein the traveling trajectory indicates locations of the target vehicle in the preset future time period in the traveling environment.

11. A non-transitory computer-readable storage medium, wherein the non-transitory computer-readable storage medium stores instructions; and when the instructions are executed on an electronic device, the electronic device is enabled to perform operations comprising:

obtaining historical trajectory information of a target vehicle and an associated vehicle of the target vehicle;

performing feature extraction on map information corresponding to a traveling environment of the target vehicle and the associated vehicle, to obtain a semantic feature indicating the map information, wherein the semantic feature of the map information comprises a lane and a travelable area in the traveling environment;

obtaining, in a processing manner, location distribution information of the target vehicle and location distribution information of the associated vehicle in a preset future time period by using the semantic feature of the map information and the historical trajectory information as input:

determining an interaction feature between the target vehicle and the associated vehicle in the preset future time period based on the location distribution information; and determining a traveling trajectory of the target vehicle in the preset future time period based on the interaction feature, the location distribution information of the target vehicle in the preset future time period, and the map information.

12. The storage medium according to claim 11, wherein the associated vehicle comprises at least one of a vehicle on a lane adjacent to a lane on which the target vehicle is located in the traveling environment of the target vehicle or a vehicle on the same lane as the target vehicle.

13. The storage medium according to claim 12, wherein the historical trajectory information comprises at least one of location information of the target vehicle and the associated vehicle obtained by the target vehicle by using a sensor, or location information of the target vehicle and the associated vehicle in a map corresponding to the traveling environment.

14. The storage medium according to claim 13, wherein the obtaining historical trajectory information of a target vehicle and an associated vehicle of the target vehicle further comprises:

obtaining, in a first processing manner, a feature vector of the historical trajectory information by using the historical trajectory information as input.

15. The storage medium according to claim 14, wherein the processing manner comprises: fusing the semantic feature of the map information and the feature vector of the historical trajectory information, to obtain the location distribution information.

16. An electronic device, comprising:

at least one processor; and at least one memory storing instructions for execution by the at least one processor to cause the electronic device to perform operations comprising:

obtaining historical trajectory information of a target vehicle and an associated vehicle of the target vehicle;

performing feature extraction on map information corresponding to a traveling environment of the target vehicle and the associated vehicle, to obtain a semantic feature indicating the map information, wherein the semantic feature of the map information comprises a lane and a travelable area in the traveling environment;

obtaining, in a processing manner, location distribution information of the target vehicle and location distribution information of the associated vehicle in a preset future time period by using the semantic feature of the map information and the historical trajectory information as input;

determining an interaction feature between the target vehicle and the associated vehicle in the preset future time period based on the location distribution information; and determining a traveling trajectory of the target vehicle in the preset future time period based on the interaction feature, the location distribution information of the target vehicle in the preset future time period, and the map information.

17. The device according to claim 16, wherein the associated vehicle comprises at least a vehicle on a lane adjacent to a lane on which the target vehicle is located in the traveling environment of the target vehicle or a vehicle on the same lane as the target vehicle.

18. The device according to claim 17, wherein the historical trajectory information comprises at least one of location information of the target vehicle and the associated vehicle obtained by the target vehicle by using a sensor, or location information of the target vehicle and the associated vehicle in a map corresponding to the traveling environment.

19. The device according to claim 18, wherein the obtain historical trajectory information of a target vehicle and an associated vehicle of the target vehicle further comprises:

obtain, in a first processing manner, a feature vector of the historical trajectory information by using the historical trajectory information as input.

20. The device according to claim 19, wherein the first processing manner comprises: encoding the historical trajectory information by using a long short-term memory (LSTM) algorithm, to obtain the feature vector indicating the historical trajectory information.

* * * * *